US008400550B2

(12) United States Patent
Fujinawa

(10) Patent No.: US 8,400,550 B2
(45) Date of Patent: Mar. 19, 2013

(54) CAMERA-EQUIPPED ELECTRONIC DEVICE

(75) Inventor: Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 1084 days.

(21) Appl. No.: 11/991,565

(22) PCT Filed: Oct. 20, 2006

(86) PCT No.: PCT/JP2006/320952
§ 371 (c)(1),
(2), (4) Date: Mar. 6, 2008

(87) PCT Pub. No.: WO2007/046500
PCT Pub. Date: Apr. 26, 2007

(65) Prior Publication Data
US 2009/0225190 A1    Sep. 10, 2009

(30) Foreign Application Priority Data
Oct. 20, 2005   (JP) .................................. 2005-305807

(51) Int. Cl.
*H04N 5/222* (2006.01)
(52) U.S. Cl. ............... 348/333.1; 348/231.7; 348/231.8; 348/333.04
(58) Field of Classification Search ................ 348/333.1
See application file for complete search history.

(56) References Cited

U.S. PATENT DOCUMENTS

| 4,862,290 | A | 8/1989 | Jung et al. |
| 5,142,379 | A | 8/1992 | Jung et al. |
| 5,745,798 | A * | 4/1998 | Hirasawa .................... 396/51 |
| 5,963,255 | A | 10/1999 | Anderson et al. |
| 6,710,809 | B1 | 3/2004 | Niikawa |
| 6,850,270 | B1 | 2/2005 | Suzuki |
| 7,268,800 | B2 * | 9/2007 | Yamagishi ................. 348/207.1 |
| 2006/0170882 | A1 * | 8/2006 | Schwartz et al. ............... 353/85 |
| 2006/0187365 | A1 * | 8/2006 | Slobodin ......................... 349/8 |

FOREIGN PATENT DOCUMENTS

| GB | 2 387 235 A | 10/2003 |
| JP | A 57-78280 | 5/1982 |
| JP | A 57-170679 | 10/1982 |

(Continued)

OTHER PUBLICATIONS

Office Action issued May 21, 2010 in European Patent Application No. EP 06 812 081.5.

(Continued)

*Primary Examiner* — Anthony J Daniels
(74) *Attorney, Agent, or Firm* — Oliff & Berridge, PLC

(57) ABSTRACT

A camera-equipped electronic device comprises a photographic unit that stores in a storage medium (12) an image obtained by photographing a subject via an imaging unit (14, 15) a non-photographic unit that executes non-photographing processing different from photographing processing executed in the photographic unit and requires electric power greater than the electric power consumed in the photographing processing, a decision-making unit (19) that makes a decision as to whether or not a current state of use is such that if the non-photographic unit is engaged in operation over a predetermined length of time, the remaining capacity in a battery (13) will become depleted to a level equal to or less than a predetermined value and a restricting unit (19) that restricts the use of the non-photographic unit with regard to the consumption of electric power based upon the results of the decision made by the decision-making unit.

25 Claims, 11 Drawing Sheets

FOREIGN PATENT DOCUMENTS

| | | |
|---|---|---|
| JP | A 63-54079 | 3/1988 |
| JP | U 1-115371 | 8/1989 |
| JP | A 3-120971 | 5/1991 |
| JP | A-3-186073 | 8/1991 |
| JP | A-6-105192 | 4/1994 |
| JP | A 7-87379 | 3/1995 |
| JP | A 8-37635 | 2/1996 |
| JP | A 11-215416 | 8/1999 |
| JP | 2000023004 A * | 1/2000 |
| JP | A 2000-23004 | 1/2000 |
| JP | A-2000-217029 | 8/2000 |
| JP | A-2001-94864 | 4/2001 |
| JP | A-2001-285704 | 10/2001 |
| JP | A-2002-77710 | 3/2002 |
| JP | A-2002-94845 | 3/2002 |
| JP | A-2002-112085 | 4/2002 |
| JP | A-2002-118781 | 4/2002 |
| JP | A 2002-118782 | 4/2002 |
| JP | A-2002-244190 | 8/2002 |
| JP | A-2003-274224 | 9/2003 |
| JP | 2004015198 A * | 1/2004 |
| JP | A 2004-15198 | 1/2004 |
| JP | A-2004-140641 | 5/2004 |
| JP | A-2005-250392 | 9/2005 |

OTHER PUBLICATIONS

Search Report issued May 7, 2010 in European Patent Application No. EP 06 812 081.5.

Nov. 22, 2011 Office Action issued in Japanese Patent Application No. 2007-541061 (with translation).

Mar. 21, 2012 Office Action issued in Japanese Patent Application No. 2007-541061 (with translation).

Aug. 7, 2012 Japanese Office Action issued in Japanese Patent Application No. 2007-541061 (with English-language translation).

* cited by examiner (a)

(b)

CAMERA-EQUIPPED ELECTRONIC DEVICE

TECHNICAL FIELD

The present invention relates to a camera-equipped electronic device having functions other than a photographing function, such as functions of receiving and displaying TV broadcasts.

BACKGROUND ART

There are digital cameras known in the related art with which dynamic images can be displayed at a liquid crystal monitor included therein. Patent reference literature 1 discloses such a digital camera with a built-in TV tuner so as to allow the user to view television broadcasts.
Patent reference literature 1: Japanese Laid Open Patent Publication No. 2000-23004

DISCLOSURE OF THE INVENTION

Problems to be Solved by the Invention

However, the overall electric power consumption, which increases during television viewing due to the electric power requirements of the monitor and the IC, is not taken into consideration in the patent reference literature. More specifically, it does not address the concern that a prospective customer checking out the digital camera at a store by displaying a television broadcast tends to try out the product longer than he would if he was checking out a camera with only a photographing function in the related art, leading to an early depletion of the battery. A similar concern exists with regard to any other digital camera with a built-in unit that draws significant electric power such as a projector instead of a television tuner.

Means for Solving the Problems

A camera-equipped electronic device according to the first embodiment of this invention comprises a photographic unit that stores in a storage medium an image obtained by photographing a subject via an imaging unit; a non-photographic unit that executes non-photographing processing different from photographing processing executed in the photographic unit and requires greater electric power than is required by the photographing processing; a decision-making unit that makes a decision as to whether or not a current state of use is such that if the non-photographic unit is engaged in operation over a predetermined length of time, remaining battery capacity will be depleted to a level equal to or less than a predetermined value; and a restricting unit that imposes restrictions on a use of the non-photographic unit with regard to consumption of the electric power based upon results of the decision made by the decision-making unit.

According to the second aspect of the invention, in the camera-equipped electronic device according to the first aspect, it is preferred that the decision-making unit includes a detection unit that detects a state of the storage medium; and the restricting unit restricts the use of the non-photographic unit with regard to the consumption of the electric power in correspondence to the detected state of the storage medium.

According to the third aspect of the invention, in the camera-equipped electronic device according to the second aspect, it is preferred that the detection unit detects the presence of the storage medium loaded in the camera-equipped electronic device; and the restricting unit restricts the use of the non-photographic unit if the presence of the storage medium loaded in the camera-equipped electronic device is not detected.

According to the fourth aspect of the invention, in the camera-equipped electronic device according to the first aspect, it is preferred that the decision-making unit includes a mode selector unit that selects one of a user mode and a non-user mode; and the restricting unit restricts the use of the non-photographic unit when the non-user mode has been selected.

According to the fifth aspect of the invention, in the camera-equipped electronic device according to the fourth aspect, it is preferred that the decision-making unit includes a detection unit that detects the presence of the storage medium loaded in the camera-equipped electronic device; and the restricting unit restricts the use of the non-photographic unit when the user mode has been selected and the presence of the storage medium loaded in the camera-equipped electronic device is detected.

According to the sixth aspect of the invention, in the camera-equipped electronic device according to the second aspect, it is preferred that there is further provided: a mode selector unit that selects one of a user mode and a non-user mode, and the detection unit detects the presence of the storage medium loaded in the camera-equipped electronic device; and the restricting unit restricts the use of the non-photographic unit when the user mode has been selected and the presence of the storage medium loaded in the camera-equipped electronic device is detected.

According to the seventh aspect of the invention, in the camera-equipped electronic device according to the second aspect, it is preferred that there is further provided a mode selector unit that selects one of a user mode and a non-user mode, and the detection unit includes a capacity detection unit that detects a remaining storage capacity available in the storage medium; and when the user mode has been selected and the detected remaining storage capacity available at the storage medium is equal to or less than a reference value, the restricting unit does not restrict the use of the non-photographic unit, whereas when the non-user mode has been selected, the restricting unit restricts the use of the non-photographic unit regardless of the detected remaining storage capacity available at the storage medium.

According to the eighth aspect of the invention, in the camera-equipped electronic device according to the first aspect, it is preferred that the decision-making unit includes a power supply detection unit that detects whether or not electric power is being supplied to the camera-equipped electronic device from an external power source; and the restricting unit restricts the use of the non-photographic unit with regard to consumption of the electric power when the power supply detection unit detects that no electric power is being supplied to the camera-equipped electronic device from the external power source.

According to the ninth aspect of the invention, in the camera-equipped electronic device according to the eighth aspect, it is preferred that there is further provided a state detection unit that detects the presence of the storage medium loaded in the camera-equipped electronic device, and the restricting unit does not restrict the use of the non-photographic unit when the state detection unit does not detect the presence of the storage medium loaded in the camera-equipped electronic device.

According to the tenth aspect of the invention, in the camera-equipped electronic device according to the eighth or the ninth aspect, it is preferred that the restricting unit does not restrict the use of the non-photographic unit with regard to the consumption of the electric power when the power supply detection unit detects that electric power is being supplied from the external power source to the camera-equipped electronic device.

According to the eleventh aspect of the invention, in the camera-equipped electronic device according to any of the first through the tenth aspect, it is preferred that there is further provided a selection unit that selects one of the photographic unit and the non-photographic unit, and the restricting unit imposes restrictions on the use of the non-photographic unit on condition that the non-photographic unit has been selected by the selection unit.

According to the twelfth aspect of the invention, in the camera-equipped electronic device according to any of the first through the eleventh aspect, it is preferred that the restricting unit performs one of allowance of the non-photographic unit to be engaged in operation over only a predetermined length of time and disallowance of engagement of a specific function among a plurality of functions of the non-photographic unit.

According to the thirteenth aspect of the invention, in the camera-equipped electronic device according to any of the first through the twelfth aspect, it is preferred that the non-photographic unit is at least one of a television unit and a projector.

Effect of the Invention

According to the present invention, early depletion of the battery can be prevented.

BEST MODE FOR CARRYING OUT THE INVENTION

The following is an explanation of embodiments of the TV tuner-equipped digital camera according to the present invention with the TV tuner thereof representing an example of a non-photographic unit having a significant electric power requirement, given in reference to FIGS. 1 through 4.

First Embodiment

Figure 1:
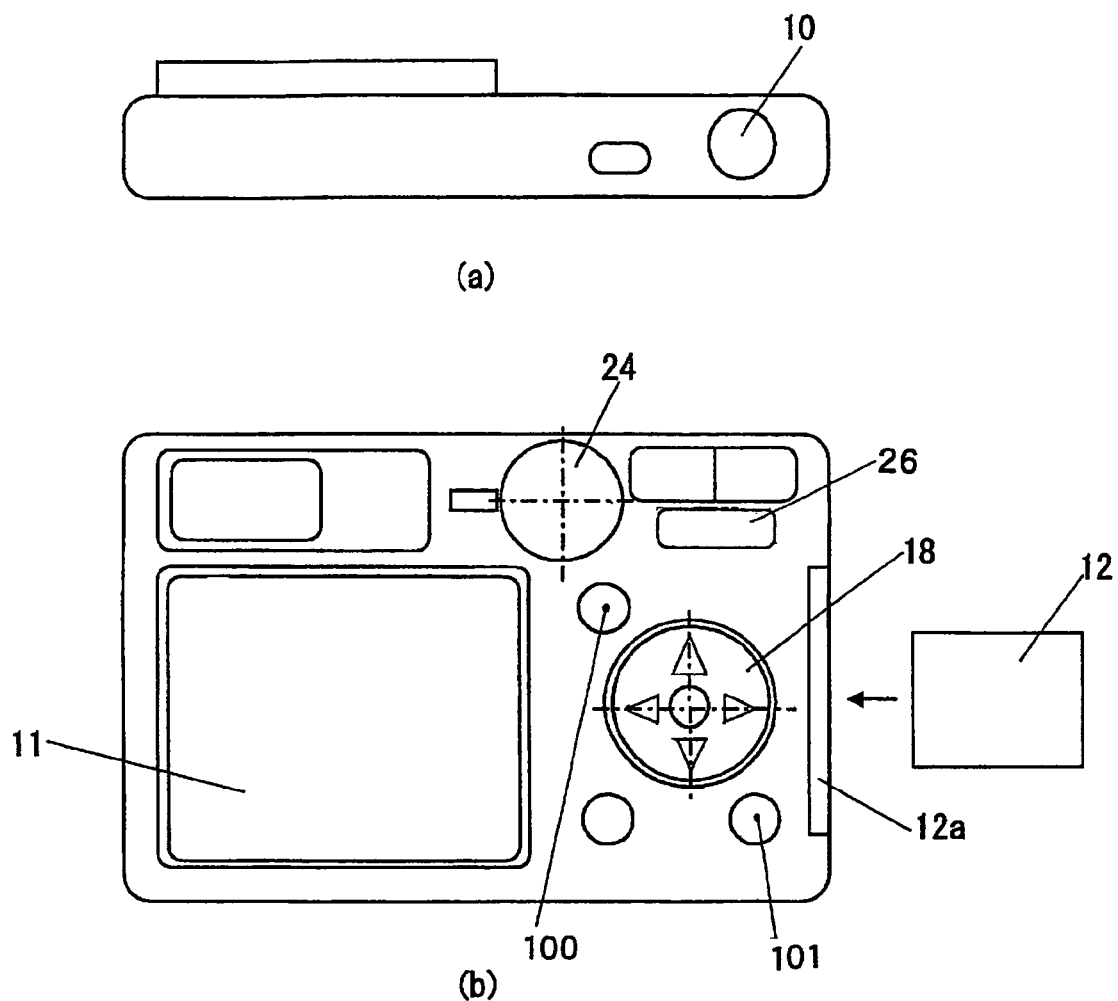
FIG. 1 External views of a TV tuner-equipped digital camera with a according to the present invention, with (a) presenting a top view and (b) presenting a rear view FIG. 2 A block diagram of the TV tuner-equipped digital camera according to the present invention FIG. 3 A flowchart of the operations executed in the TV tuner-equipped digital camera in a first embodiment of the present invention FIG. 4 A flowchart of the operations executed in the TV tuner-equipped digital camera in a second embodiment of the present invention FIG. 5 A block diagram of a projector-equipped digital camera according to the present invention FIG. 6 A flowchart of the operations executed in the projector-equipped digital camera according to the present invention FIG. 7 A flowchart of the operations executed in the TV tuner-equipped digital camera in a fourth embodiment of the present invention FIG. 8 A block diagram of the essential structure adopted in a TV tuner/projector-equipped digital camera according to the present invention FIG. 9 A flowchart of the operations executed in the TV tuner/projector-equipped digital camera FIG. 10 A block diagram of the essential structure adopted in the TV tuner-equipped digital camera in a sixth embodiment of the present invention FIG. 11 A flowchart of the operations executed in the TV tuner-equipped digital camera in the sixth embodiment of the present invention
Figure 2:
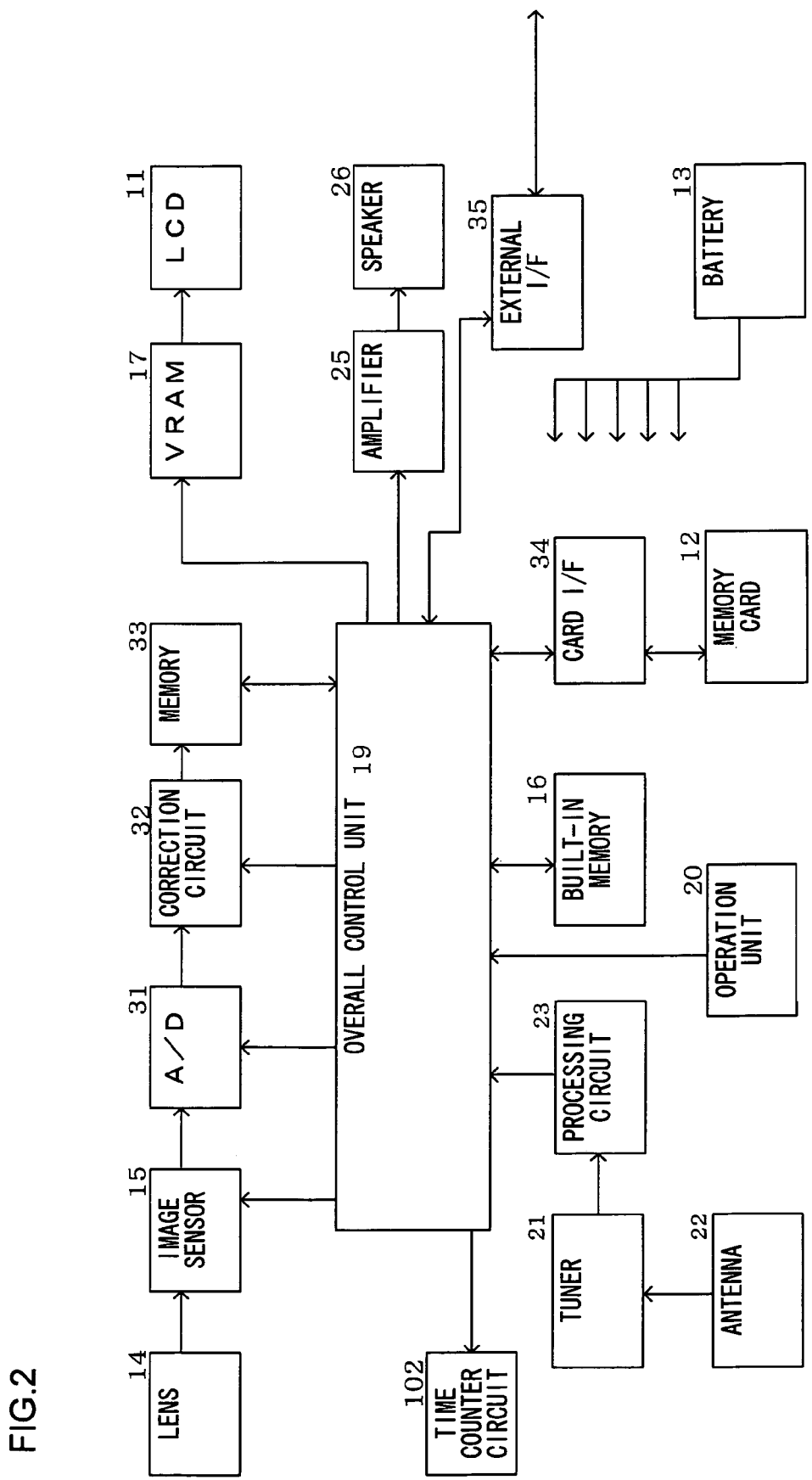

FIG. 1 provides external views of the TV tuner-equipped digital camera according to the present invention and FIG. 2 provides a block diagram of the TV tuner-equipped digital camera. An object of the first embodiment is to limit the length of time over which a television broadcast can be viewed at a retail shop. The digital camera is judged to be in a retail store mode when a memory card is loaded therein. The TV tuner-equipped digital camera has a digital camera function and a TV tuner function. It is to be noted that the elements engaged in operation primarily to fulfill these functions are collectively referred to as a digital camera unit and a TV tuner unit.

The digital camera unit includes a lens 14, an image sensor 15, a typical example of which is a CCD sensor or a CMOS sensor, a shutter release button switch 10 operated by the user, a cross key 18 operated by the user to select various settings, an built-in memory 16 where a captured image is temporarily stored, an overall control unit 19 that includes a CPU and its peripheral circuits engaged in operation to execute various types of photographing control and execute image composite processing to be detailed later, a liquid crystal monitor 11 at which a reproduced photographic image, a through image or various settings menus are displayed with a backlight (not shown), and a memory card slot 12a at which a memory card 12 having saved therein captured images together with image capturing time information indicating times counted via a time counter circuit 102. It is to be noted that the liquid crystal monitor 11 may be constituted with a light emitting element such as an organic EL (electroluminescence) element. A memory card 12 may assume any form as long as it is a recording medium that can be detachably loaded into the camera body. Reference numeral 13 indicates a battery, reference numeral 31 indicates an A/D conversion circuit, reference numeral 32 indicates a correction circuit, reference numeral 33 indicates a memory, reference numeral 34 indicates a card I/F and reference numeral 35 indicates an external I/F. It is to be noted that a signal (card detection signal) indicating the presence/absence of a card in the memory card slot 12a is input to the overall control unit 19 via the card I/F 34. At the rear surface of the TV tuner-equipped digital camera, a menu button 100 operated to bring up a setting menu at the liquid crystal monitor 11 and a display button 101 operated to bring up on display at the liquid crystal monitor 11 the newest photographic image most recently stored in the built-in memory 16, are disposed.

The TV tuner unit includes a tuner 21, an antenna 22, a processing circuit 23 that digitally processes the video signal in a received television broadcast, a speaker 26 through which the television broadcast sound is output and an amplifier 25 that amplifies the sound. The TV tuner unit shares with the digital camera unit the overall control unit 19 which also executes various types of control related to the television broadcast, the liquid crystal monitor 11 at which the received television image is displayed, and the cross key 18. It is to be noted that an operation unit 20 in FIG. 2 represents various operation members including the cross key 18. In a camera mode, the cross key 18 is used as the zoom button and the like, whereas it is used in a television mode for selecting a channel and adjusting the volume. The operation unit 20 in this embodiment includes a mode selector switch 24 with which a changeover operation is performed to change over from the "camera mode" to the "television mode" and vice versa.

Figure 3:
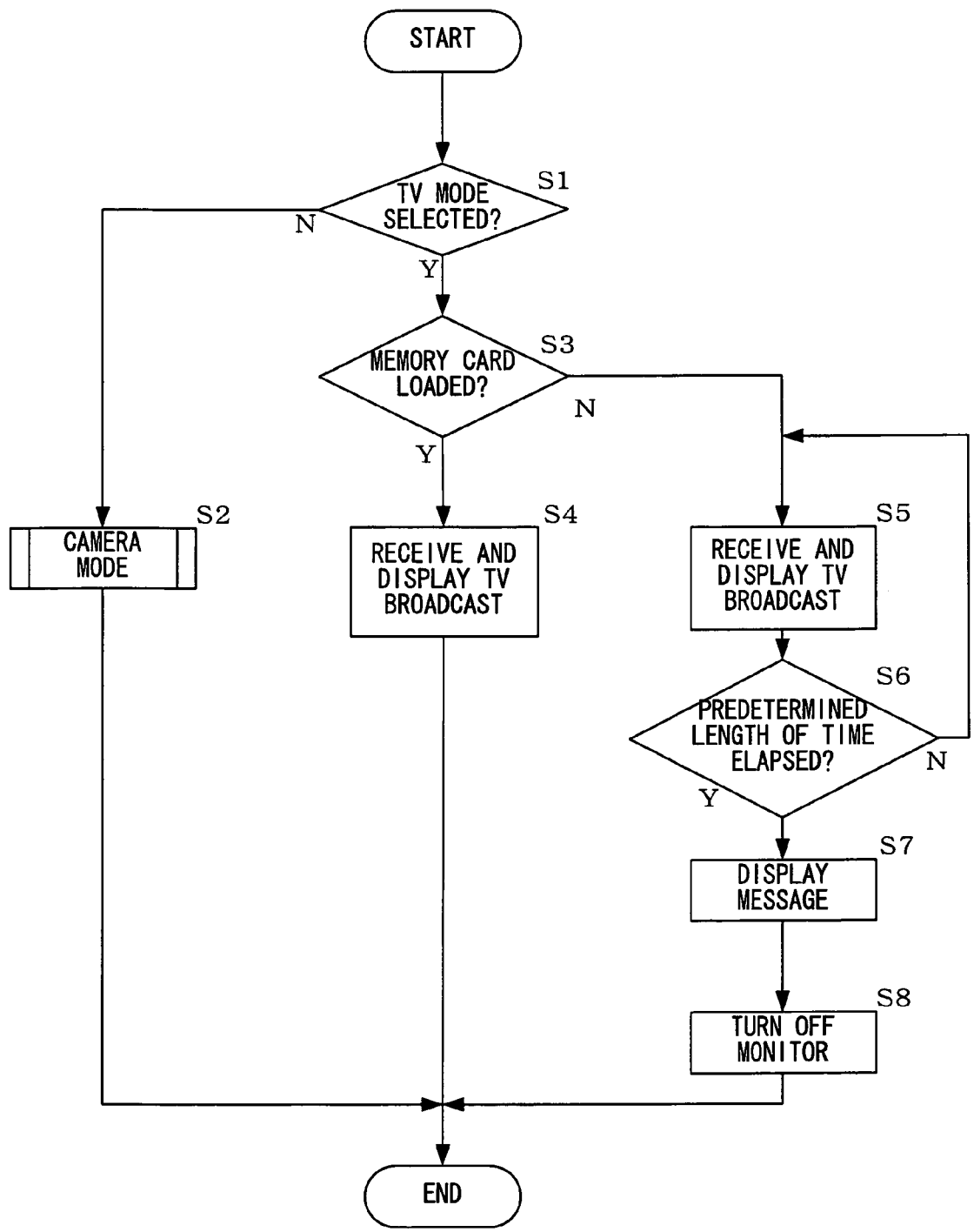

The following is an explanation of the operations executed in the TV tuner-equipped digital camera according to the present invention, given in reference to the flowchart presented in FIG. 3. The individual processing procedures shown in FIG. 3 are executed based upon a program by the overall control unit 19. The program based upon which the various types of processing in FIG. 3 is executed is stored in a memory (not shown) and is started up in response to an operation signal input via the mode selector switch 24.

As a negative decision is made with regard to "television mode selected?" in step S1 in FIG. 3, i.e., if it is decided that the "camera mode" has been set at the mode selector switch 24 through a user operation, the operation proceeds to step S2. In step S2, various types of processing are executed to allow the TV tuner-equipped digital camera to function as a digital camera.

In the camera mode, a subject light flux transmitted through the lens 14 forms an image at the light receiving surface of the image sensor 15, which, in turn, outputs an image signal corresponding to the intensity of the light constituting the subject image. The image signal is then converted to a digital signal at the A/D conversion circuit 31 and undergoes various types of image processing at the correction circuit 32 to generate image data. The image data thus generated are stored into the memory 33 used as a primary buffer. The image data stored in the memory 33 are compressed as necessary and are recorded into the built-in memory 16 used as a secondary buffer. If a memory card 12, i.e., a recording medium, is loaded, the photographic image data are transferred from the built-in memory 16 and recorded into a memory card 12.

A photographic image is reproduced by transferring the corresponding image data recorded in the built-in memory 16 or a memory card 12 to a VRAM 17 and bringing up the image corresponding to the image data on display at the liquid crystal monitor 11 under control executed by the overall control unit 19. In addition, in a photographing standby state, image data obtained by photographing an image over a predetermined time interval are recorded into the built-in memory 16 and are also transferred by the overall control unit 19 to the VRAM 17 so as to bring up a real time display of the image corresponding to the image data at the liquid crystal monitor 11. As a result, the photographer is able to view the subject as a dynamic image at the liquid crystal monitor 11. It is to be noted that the VRAM 17, which functions as a buffer memory where the image data used for display of a reproduced image at the liquid crystal monitor 11 are held, has a capacity for storing image data, the volume of which corresponds to the number of pixels at the liquid crystal monitor 11.

If an affirmative decision is made in step S1 in FIG. 3, i.e., if it is decided that the "television mode" has been set at the mode selector switch 24 through a user operation, the operation proceeds to step S3. If an affirmative decision is made with regard to "memory card loaded?" in step S3, i.e., if it is decided that a memory card 12 is loaded based upon a card detection signal received via the card I/F 34, the operation proceeds to step S4. In step S4, various types of processing are executed so as to allow the TV tuner-equipped digital camera to function as a television tuner alone.

In the television mode, television signals are received at the tuner 21 from the antenna 22 and a sound signal and a video signal are output. The sound signal is amplified at the amplifier 25 and is then output through the speaker 26. The video signal undergoes digital processing for display at the processing circuit 23. The video signal having undergone the digital processing for display is temporarily saved as video data into the built-in memory 16 or a memory card 12, and is also transferred by the overall control unit 19 to the VRAM 17. The video image corresponding to the video data is then brought up on display at the liquid crystal monitor 11. It is to be noted that channel selection at the tuner 21 is controlled by the overall control unit 19 based upon the results of an operation at the cross key 18.

If a negative decision is made in step S3, i.e., if it is decided that no memory card 12 is loaded, the operation proceeds to step S5. In step S5, the television broadcast received as described above is stored into the built-in memory 16 and the video image is displayed at the liquid crystal monitor 11 via the VRAM 17. The operation then proceeds to step S6. It is to be noted that a timer is started up in step S5 to limit the length of time over which the TV broadcast is to be received.

In step S6, the length of time having been counted at the timer is read and the length of time that has elapsed following the television broadcast reception start is detected. If an affirmative decision is made in step S6, i.e., if it is decided that a predetermined length of time has elapsed following the television broadcast reception start, the operation proceeds to step S7. If, on the other hand, a negative decision is made in step S6, i.e., if it is decided that the predetermined length of time has not elapsed following the television broadcast reception start, the operation returns to step S5 to continuously receive the television broadcast and display the television broadcast at the liquid crystal monitor 11. The predetermined length of time may be approximately "30 seconds", which may be selected as a default value or the time may be selected at the retail shop by subsequently modifying the default value. An upper limit is set to the length of time that may be selected at the retail shop in adherence to the concept of the present invention of limiting battery consumption.

In step S7 to which the operation proceeds when the predetermined length of time elapses following the television broadcast reception start, a message such as "demonstration mode display ending" is brought up on display over a specific length of time at the liquid crystal monitor 11. The operation then proceeds to step S8 to turn off the display at the liquid crystal monitor 11, thereby ending the series of processing.

The following advantage is achieved in the TV tuner-equipped digital camera in the first embodiment of the present invention described above. Namely, depending upon the loaded/unloaded state of a memory card 12, the overall control unit 19 imposes restrictions on the use of electric power at the TV tuner unit, i.e., a non-photographic unit, that executes non-photographing processing distinguishable from photographing processing. Namely, if a memory card 12 is not loaded in the camera body, the overall control unit 19 imposes restrictions with regard to the length of time over which the television broadcast can be received. As a result, excessive battery power consumption is prevented. The present invention is particularly effective in preventing television broadcast display over an excessively long period of time while a prospective customer considers the pros and cons of the potential purchase since the demonstration model at a retail shop is not likely to have a memory card 12 loaded therein as a theft deterrent measure and the like. It is to be noted that the demonstration model will be able to provide full digital camera performance via the built-in memory 16 even when a memory card 12 is not loaded.

Second Embodiment

The second embodiment of the present invention is now described. The TV tuner-equipped digital camera achieved in the second embodiment includes components identical to those of the TV tuner-equipped digital camera in the first embodiment shown in FIGS. 1 and 2. In the TV tuner-equipped digital camera in the second embodiment set in the television mode via the mode selector switch 24, the overall control unit 19 displays at the liquid crystal monitor 11 a demonstration dynamic image stored in advance in the built-in memory 16 if it detects no memory card 12 is loaded. When the demonstration dynamic image has been on display over a predetermined length of time, e.g., 30 seconds, the overall control unit 19 turns off the liquid crystal monitor 11.

Figure 4:
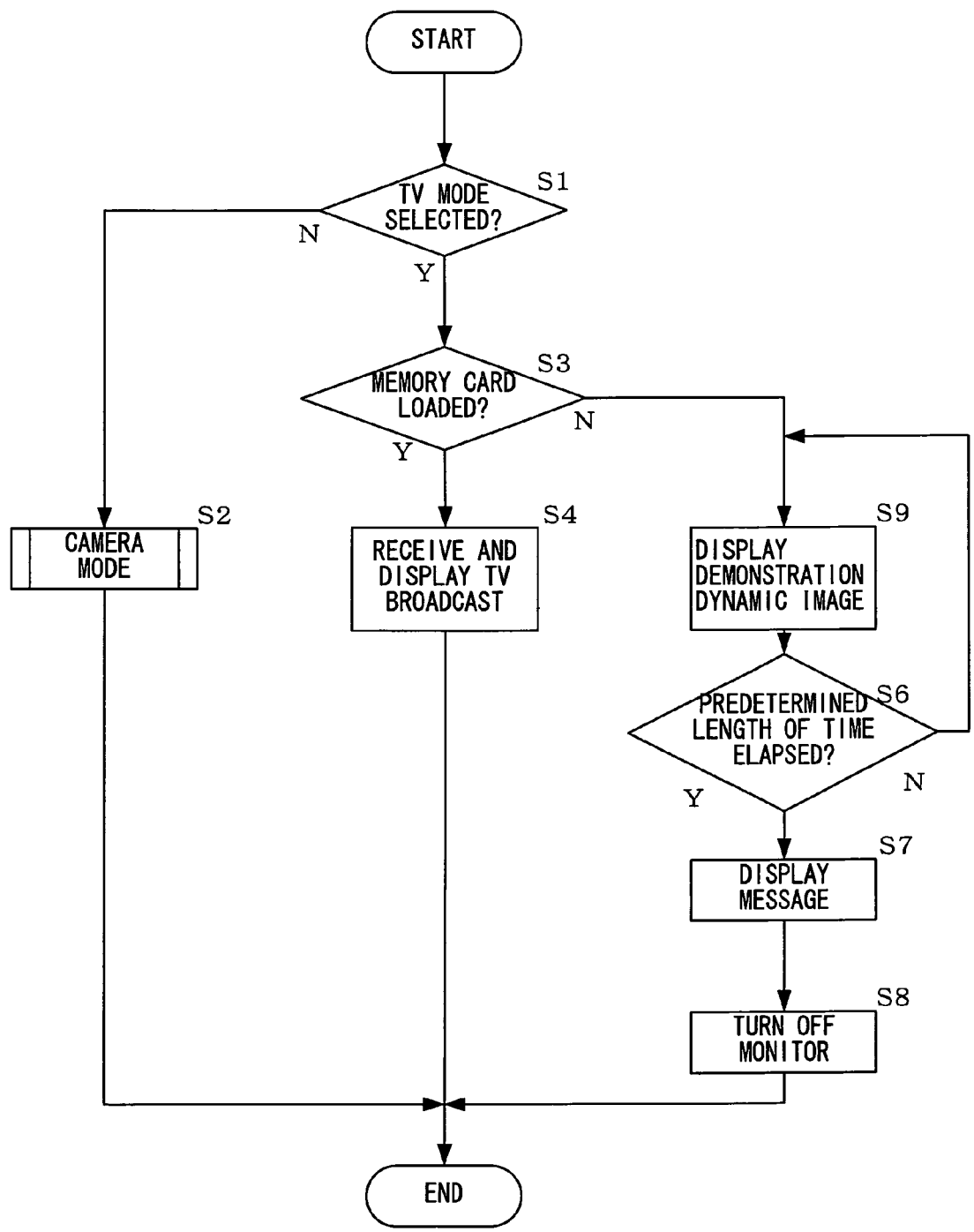

The following is an explanation of the operations executed in the TV tuner-equipped digital camera in the second embodiment, given in reference to the flowchart presented in FIG. 4. The individual processing procedures shown in FIG. 4 are executed based upon a program by the overall control unit 19. The program based upon which the various types of processing in FIG. 4 is executed is stored in a memory (not shown) and is started up in response to an operation signal input via the mode selector switch 24. It is to be noted that the same processing step numbers are assigned to steps in which processing identical to that in the flowchart in FIG. 3 is executed so as to preclude the need for a repeated explanation thereof.

If it is decided in step S3 in FIG. 4 that no memory card 12 is loaded, the operation proceeds to step S9. In step S9, a demonstration dynamic image similar to a television broadcast, stored in advance in the built-in memory 16, is displayed at the liquid crystal monitor 11 instead of receiving and displaying a television broadcast, and then the operation proceeds to step S6. As in step S5 described in reference to FIG. 3, the timer for restricting the length of time over which the TV tuner-equipped digital camera is to engage in television operation is started up in step S9. It is to be noted that the dynamic image may be a sample television program or a television commercial. This dynamic image can also be brought up on display in the regular operation mode.

The following advantages are achieved in the TV tuner-equipped digital camera in the second embodiment described above. When no memory card 12 is loaded in the camera body, the overall control unit 19 displays the demonstration dynamic image similar to a received television broadcast instead of actually receiving a television broadcast. Thus, the consumption of electric power at the IC used in the television broadcast reception circuit is minimized. In addition, as in the first embodiment, the length of time over which the dynamic image remains on display at the liquid crystal monitor 11 is restricted to a predetermined time length by the overall control unit 19 if no memory card 12 is loaded in the camera body and thus, excessive battery power consumption is prevented through the second embodiment as well. The second embodiment is particularly effective in preventing television broadcast display over an excessively long period of time while a prospective customer considers the pros and cons of the potential purchase since the demonstration model at a retail shop is not likely to have a memory card 12 loaded therein as a theft deterrence measure and the like. It is to be noted that the demonstration model will be able to provide full digital camera performance via the built-in memory 16 even when a memory card 12 is not loaded.

Third Embodiment

Figure 5:
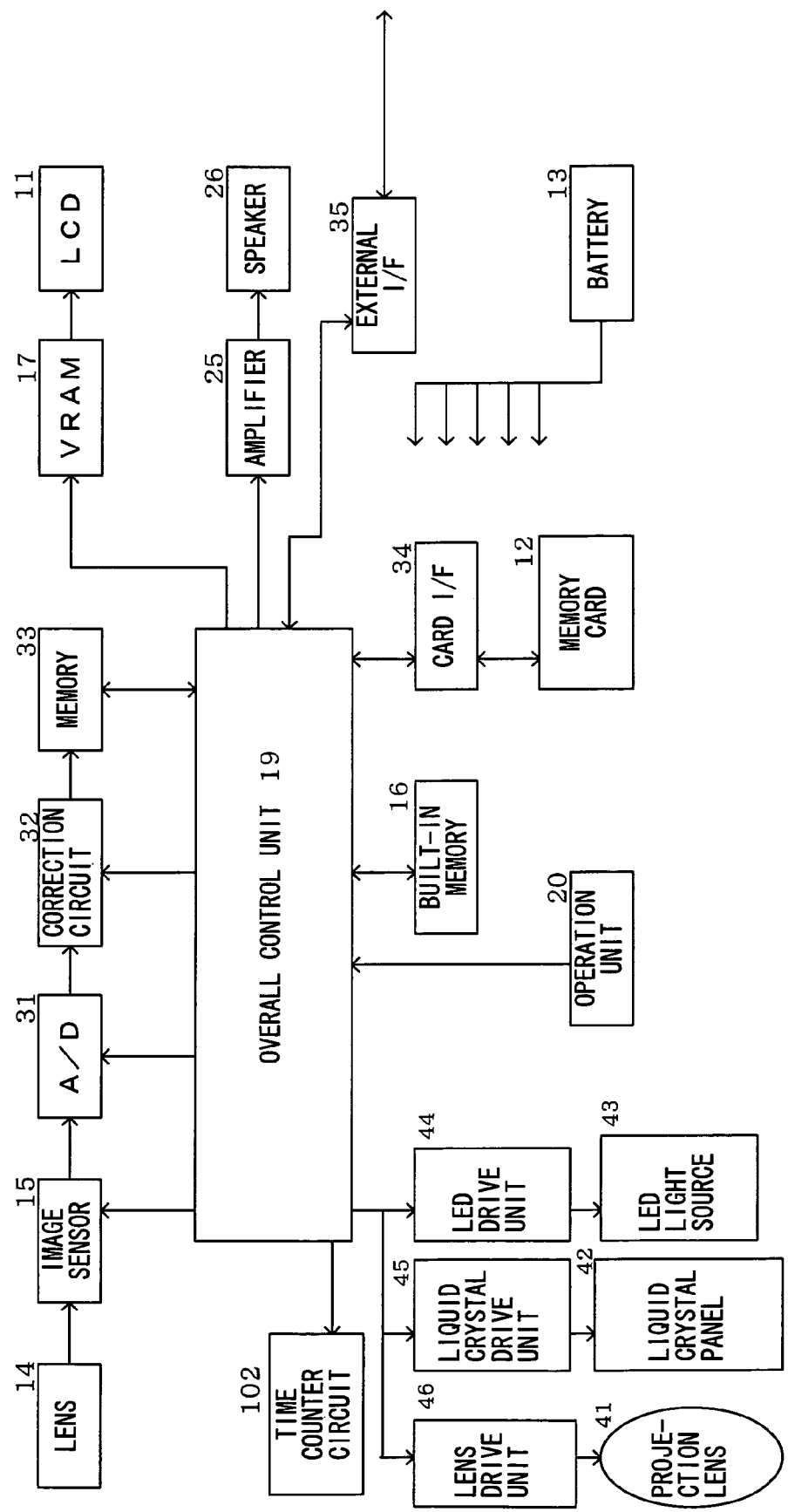
Figure 6:
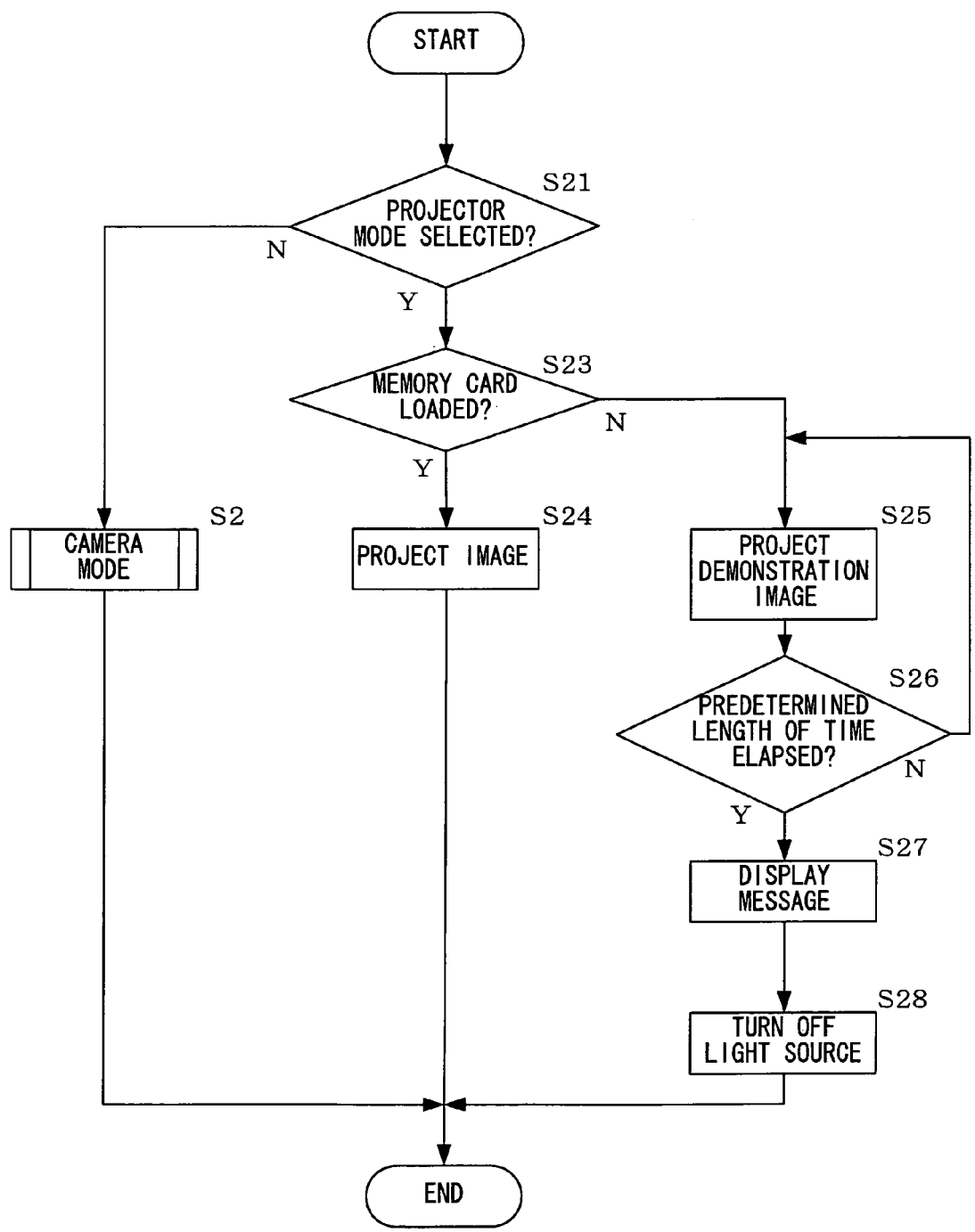

Next, a projector-equipped digital camera achieved in an embodiment of the present invention, with the projector representing an example of the non-photographic unit with significant electric power requirements, is explained in reference to FIGS. 5 and 6.

FIG. 5 presents a block diagram of the projector-equipped digital camera achieved in the third embodiment. The projector-equipped digital camera has a projector function and a digital camera function. It is to be noted that the elements engaged in operation primarily to fulfill these functions are collectively referred to as the digital camera unit and the projector unit. The structure of the digital camera unit is identical to that of the digital camera unit in the TV tuner-equipped digital camera described above. It is to be noted that the mode selector switch 24 at the operation unit 20 is operated to change over from "the camera mode" to the "projector mode" and vice versa.

The projector unit includes a projection lens 41, a liquid crystal panel 42, an LED light source 43, an LED drive unit 44, a liquid crystal drive unit 45 and a lens drive unit 46. The LED drive unit 44 supplies an electrical current to the LED light source 43 in response to an LED drive signal output from the overall control unit 19. The LED light source 43 illuminates the liquid crystal panel 42 with brightness, the level of which corresponds to the current supplied thereto. The quantity of light from the LED light source 43 can be manually adjusted via a control dial or the like (not shown). It is to be noted that the projector unit is used to project an image corresponding to image data stored in a memory card 12 or the built-in memory 16 onto a screen (not shown). In addition, if the projector-equipped digital camera further includes the antenna 22, the tuner 21 and the processing unit 23 having been described in reference to the first embodiment and the second embodiment and is thus capable of receiving television broadcasts, a received television broadcast can be projected via the projector unit.

The following is an explanation of the operations executed in the projector-equipped digital camera in the embodiment, given in reference to the flowchart presented in FIG. 6. The individual processing procedures shown in FIG. 6 are executed based upon a program by the overall control unit 19. The program based upon which the various types of processing in FIG. 6 is executed is stored in a memory (not shown) and is started up in response to an operation signal input via the mode selector switch 24.

If an affirmative decision is made with regard to "projector mode selected?" in step S21 in FIG. 6, i.e., if it is decided that the "projector mode" has been set at the mode selector switch 24, the operation proceeds to step S23. In step S23, a decision is made as to whether or not a memory card 12 is loaded based upon a detection signal provided from the card I/F 34. If an affirmative decision is made in step S23, i.e., if it is decided that a memory card 12 is loaded, the operation proceeds to step S24 to execute various types of processing to allow the projector-equipped digital camera to function as a projector only. It is to be noted that if a negative decision is made in step S21, i.e., if it is decided that the "camera mode" has been set at the mode selector switch 24, the operation proceeds to step S2 to execute various types of processing to allow the projector-equipped digital camera to function as a digital camera only, as explained earlier.

In the projector mode, the overall control unit 19 reads out image data stored in a memory card 12. The liquid crystal drive unit 45 generates a liquid crystal panel drive signal in correspondence to the image data thus read out and drives the liquid crystal panel 42 with the generated drive signal. More specifically, it applies a voltage to the liquid crystal layer for each pixel in correspondence to the image signal. As the voltage is thus applied, the arrangement of the liquid crystal molecules changes at the liquid crystal layer, altering the transmittance of light at the liquid crystal layer. By modulating the light from the LED light source 43 in correspondence to the image signal as described above, the liquid crystal panel 42 generates a light image.

Based upon a control signal output from the overall control unit 19, the lens drive unit 46 drives the projection lens 41 so that it advances/retreats along the optical axis. The light image emitted from the liquid crystal panel 42 is projected via the projection lens 41 toward the screen or the like.

If a negative decision is made in step S23, i.e., if it is decided that no memory card 12 is loaded, the operation proceeds to step S25. In step S25, a projector operation is started up as in step S24 to project the demonstration image, before the operation proceeds to step S26. As described earlier in reference to step S5 in FIG. 3, a timer is started up in step S25 to impose restrictions on the length of time over which the projector-equipped digital camera is to operate as a projector. It is to be noted that the demonstration image is a sample image stored in advance in the built-in memory 16.

In step S26, the length of time having been counted on the timer is read and a decision is made as to whether or not a predetermined length of time has elapsed following the start of the projection via the projector. If an affirmative decision is made in step S26, i.e., if it is decided that the predetermined length of time has elapsed following the projection start, the operation proceeds to step S27. If, on the other hand, a negative decision is made in step S26, i.e., if it is decided that the predetermined length of time has not elapsed following the projection start, the operation returns to step S25 to continuously project the demonstration image via the projector. The setting for the predetermined length of time is selected as has been explained earlier.

In step S27 to which the operation proceeds when the predetermined length of time elapses following the projection start, a message such as "demonstration mode display ending" is brought up on display over a specific length of time at the screen and the liquid crystal monitor 11. The operation then proceeds to step S28 to turn off the LED light source 33 so as to end the series of processing by ending the projection via the projector. It is to be noted that the message may remain on display at the liquid crystal monitor 11 over a specific length of time after the projection via the projector ends.

It is to be noted that the battery power consumption can be further reduced by applying the following restrictions when no memory card is loaded in a projector that allows manual adjustment of the light source brightness.
(1) Disallow a light source brightness adjusting operation. Or, set an upper limit value and disallow adjustment to the maximum brightness level.
(2) Adjust to the standard brightness level first and then disallow brightness adjustment if the maximum brightness level is currently selected for the light source brightness.

The following advantage is achieved in the projector-equipped digital camera in the third embodiment described above. If no memory card 12 is loaded, the overall control unit 19 restricts the length of time over which the projector is allowed to engage in projection to the predetermined length of time, e.g., 30 seconds. Excessive battery power consumption is thus prevented. The third embodiment is particularly effective in preventing projection over an excessively long period of time while a prospective customer considers the pros and cons of the potential purchase since the demonstration model at a retail shop is not likely to have a memory card 12 loaded therein as a theft deterrence measure and the like. It is to be noted that the demonstration model will be able to provide full digital camera performance via the built-in memory 16 even when a memory card 12 is not loaded.

Fourth Embodiment

Figure 7:
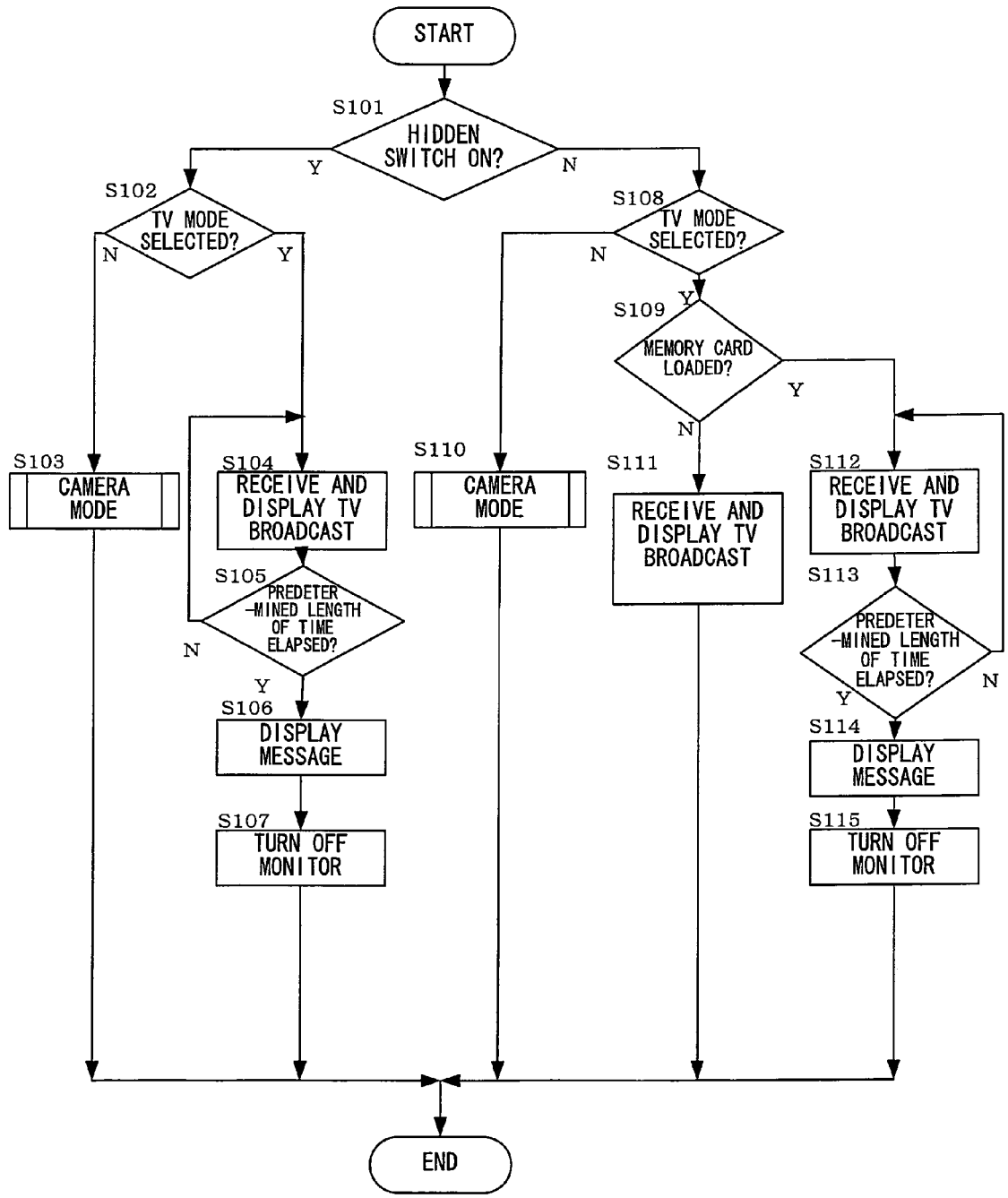

The fourth embodiment of the present invention is now described in reference to FIG. 7. The TV tuner-equipped digital camera achieved in the fourth embodiment includes components identical to those of the TV tuner-equipped digital camera in the first embodiment shown in FIGS. 1 and 2.

A mode changeover is executed to switch camera functions for the camera use at the retail shop or for the camera use by a user having purchased the camera by turning on/off a hidden switch in the TV tuner-equipped digital camera in the fourth embodiment. A non-user mode is selected when the hidden switch is in an ON state so as to impose restrictions on the length of time over which a television broadcast can be received. When the TV tuner-equipped digital camera is handed over to a purchasing user, the mode setting is turned off, thereby switching to the user mode. Once the user purchases the camera, the overall control unit 19 adjusts the restriction imposed on the length of time over which a television broadcast can be received at the TV tuner unit in correspondence to whether or not a memory card is loaded.

The hidden switch may be constituted with, for instance, the shutter release button switch 10, the menu button 100 and the display button 101, disposed at different surfaces. For instance, the hidden switch may enter an ON state after the shutter release button switch 10, the menu button 100 and the display button 101 are continuously held down simultaneously for 10 seconds, so as to shift into an operation mode in which the use of the TV tuner unit is restricted. This operation mode is the non-user mode selected when the TV tuner-equipped digital camera is displayed at a retail shop or the like, as described earlier. As the shutter release button 10, the menu button 100 and the display button 101 are held down together in this state for 10 seconds, the hidden switch enters an OFF state to shift into the user mode, i.e., the regular operation mode in which the user operates the TV tuner-equipped digital camera. A decision as to whether or not to shift into the user mode or the non-user mode is made by the overall control unit 19. Since the operation mode shifts into the non-user mode only if the operation members disposed at different surfaces are operated simultaneously over a predetermined length of time (e.g., 10 seconds), the TV tuner-equipped digital camera is never allowed to inadvertently shift from the user mode to the non-user mode due to a plurality of operation members becoming depressed in a specific position at which the camera is held.

In addition, by constituting the hidden switch with operation members that are only operated in operation modes different from one another (e.g., individually in the photographing mode and the display mode), such as the shutter release button 10, which is operated only in the photographing mode and a reproduced image frame feed switch, which is operated only in the display mode, the risk of the camera mode shifting into the non-user mode due to an inadvertent operation can be further reduced. By assuming a structure in which the operation described above is accepted only when the time information output by the time counter circuit 102 indicates a time before the retail shop opening time, e.g., a time between 8 a.m. and 8:10 a.m., an inadvertent shift between the non-user mode and the user mode can be reliably prevented.

When the hidden switch is in the ON state, the overall control unit 19 sets the TV tuner-equipped digital camera in the non-user mode. In the non-user mode, as a signal indicating that the television mode has been selected is input from the mode selector switch 24, the overall control unit 19 restricts the length of time over which a television broadcast can be received at the TV tuner unit, i.e., a non-photographic unit, to a predetermined length of time, e.g., 30 seconds. In other words, when the thirty-second period elapses following the start of the television image display at the liquid crystal monitor 11, the overall control unit 19 ends the operation by the TV tuner unit and turns off the liquid crystal monitor 11.

When the hidden switch described above is in the OFF state, the overall control unit 19 sets the TV tuner-equipped digital camera in the user mode. Upon receiving from the mode selector switch 24 a signal indicating that the television mode has been selected, the overall control unit 19 verifies whether or not a memory card 12 is loaded. If a memory card 12 is not loaded, i.e., if no card detection signal is input via the card I/F 34, the overall control unit 19 does not impose any restrictions with regard to the length of time over which television broadcasts can be received. If, on the other hand, a memory card 12 is loaded, i.e., if a card detection signal is input from the card I/F 34, the overall control unit 19 imposes the restrictions so as to limit the television broadcast reception time to the predetermined length of time, i.e., 30 seconds. In other words, when the thirty-second period elapses following the start of the television image display at the liquid crystal monitor 11, the overall control unit ends the operation by the TV tuner unit and turns off the liquid crystal monitor 11.

The following is an explanation of the operations executed in the TV tuner-equipped digital camera in the fourth embodiment, given in reference to the flowchart presented in FIG. 7. The individual processing procedures shown in FIG. 7 are executed based upon a program by the overall control unit 19. The program based upon which the various types of processing in FIG. 7 is executed is stored in a memory (not shown) and is started up in response to an operation signal input via the mode selector switch 24.

In step S101, a decision is made as to whether or not the hidden switch has been turned on. If the hidden switch is in the ON state, an affirmative decision is made in step S101 and the operation proceeds to step S102. If, on the other hand, the hidden switch is in the OFF state, a negative decision is made in step S101 and the operation proceeds to step S110.

In step S102, a decision is made as in step S1 in FIG. 3 as to whether or not the television mode has been selected via the mode selector switch 24. If the television mode has been selected, an affirmative decision is made in step S102 and the operation proceeds to step S104. The processing executed in step S104 (television broadcast reception/display) through step S107 (monitor off) is similar to the processing executed in step S5 (television broadcast reception/display) through step S8 (monitor off) in FIG. 3. If the camera mode has been selected, a negative decision is made in step S102 and the operation proceeds to step S103. In step S103, various types of processing are executed to allow the TV tuner-equipped digital camera to function as a digital camera, as in step S2 in FIG. 3.

In step S108, to which the operation proceeds after making a negative decision in step S101, a decision is made as in step S102 as to whether or not the television mode has been selected. If the television mode has been selected, an affirmative decision is made in step S108 and the operation proceeds to step S109. If the camera mode has been selected, a negative decision is made in step S102 and the operation proceeds to step S110. In step S110, various types of processing are executed to allow the TV tuner-equipped digital camera to function as a digital camera, as in step S103.

In step S109, a decision is made as to whether or not a memory card 12 is loaded. If a memory card 12 is loaded, i.e., if a card detection signal is input from the card I/F 34, an affirmative decision is made in step S109 and the operation proceeds to step S112. The processing executed in step S112 (television broadcast reception/display) through step S115 (monitor off) is similar to the processing executed in step S104 (television broadcast reception/display) through step S107 (monitor off). If no memory card 12 is loaded, a negative decision is made in step S109 and the operation proceeds to step S111. In step S111, the image of the television broadcast received at the TV tuner 21 is displayed at the liquid crystal monitor 11, as in step S4 in FIG. 3.

The following advantages are achieved in the TV tuner-equipped digital camera in the fourth embodiment of the present invention described above.

(1) When the hidden switch is in the ON state and the TV tuner-equipped digital camera is set in the non-user mode, the overall control unit 19 imposes restrictions with regard to the use of the TV tuner unit, i.e., a non-photographic unit by limiting the length of time over which the TV tuner unit is allowed to receive television broadcast. Since this prevents television display over an unnecessarily long period of time while a prospective customer is trying out the camera set in the non-user mode at a retail store, battery power is not consumed to an excessive extent.

(2) When the hidden switch is in the OFF state and the TV tuner-equipped digital camera is set in the user mode, the overall control unit 19 upon detecting that a memory card 12 is loaded, imposes restrictions on the use of the TV tuner unit by limiting the length of time over which the TV tuner unit is allowed to receive television broadcast. When a memory card 12 is loaded in the TV tuner-equipped digital camera set in the user mode, the user is likely to use the camera to photograph a subject. Since the non-photographic unit cannot be used over an extended period of time under such circumstances, excessive battery power consumption is prevented so as to ensure that sufficient battery power is available for the photographic unit operation while photographing the subject.

Fifth Embodiment

Figure 8:
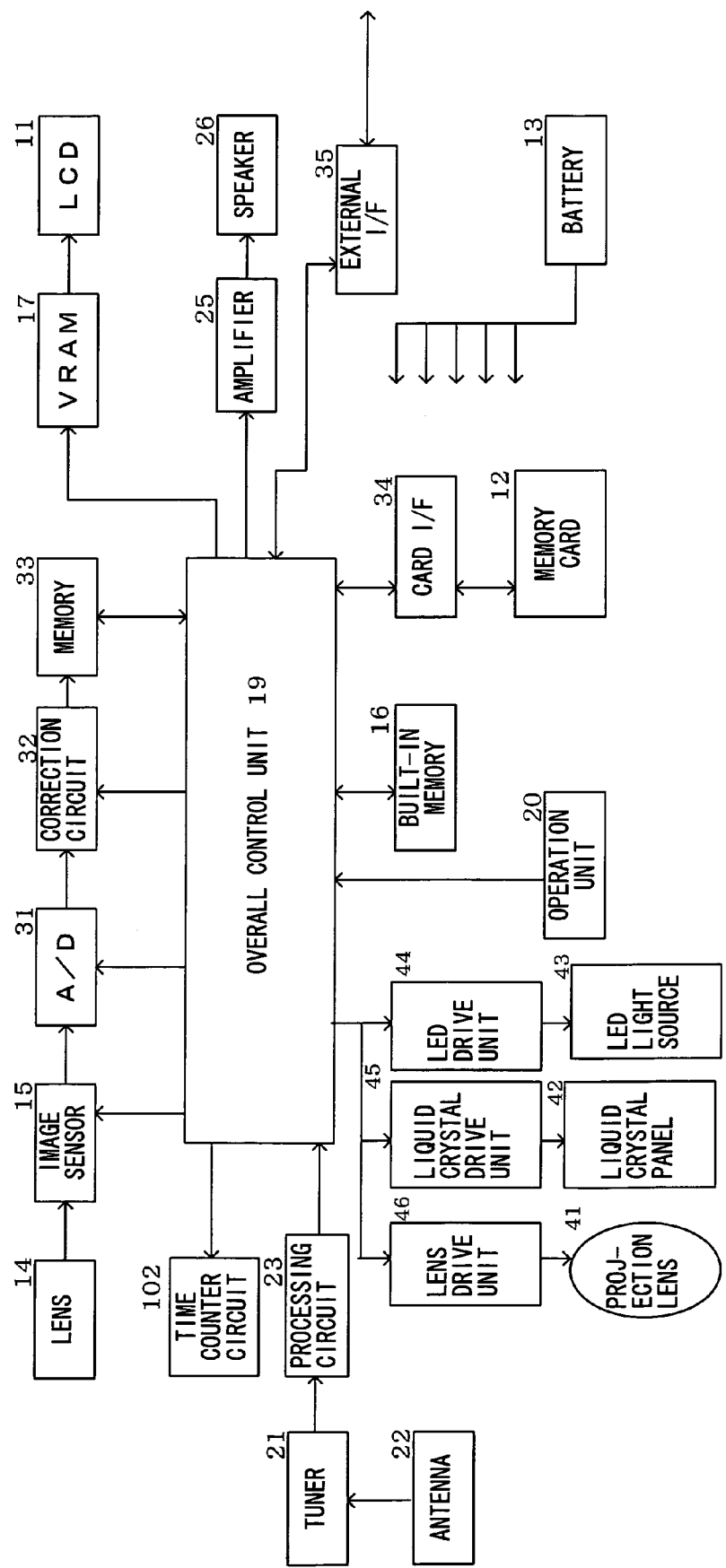
Figure 9:
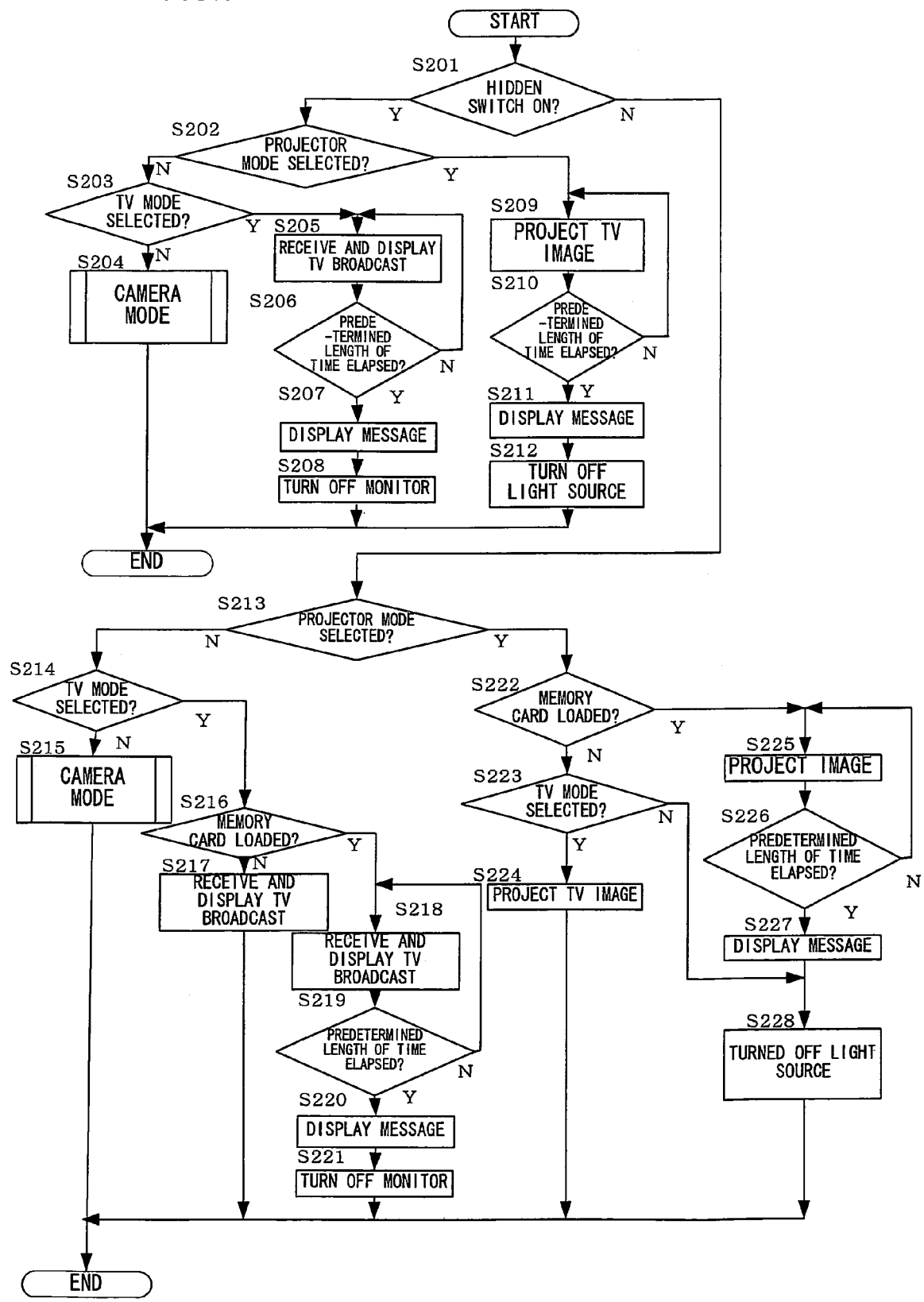

In reference to FIGS. 8 and 9, the TV tuner/projector-equipped digital camera achieved in the fifth embodiment of the present invention is described. FIG. 8 shows the essential structure of the TV tuner/projector-equipped digital camera, the external appearance of which is identical to that shown in FIG. 1. It is to be noted that the same reference numerals are assigned to components identical to those of the TV tuner-equipped digital cameras and the projector-equipped digital camera achieved in the first through fourth embodiment. The mode selector switch 24 at the operation unit 20 can be operated to select the "television mode", the "projector mode" or the "camera mode". Of these, the "projector mode" and the "television mode" can be selected at the same time. At this dual-mode setting, the video image of a television broadcast received at the tuner 21 can be projected via the projector unit. The "camera mode", on the other hand, is never selected in combination with the "projector model" or the "television mode".

As does the TV tuner-equipped digital camera in the fourth embodiment, the TV tuner/projector-equipped digital camera in the fifth embodiment includes a hidden switch. When the hidden switch is in the ON state, i.e., when the non-user mode has been selected, restrictions are imposed with regard to the length of time over which the TV tuner unit and the projector unit can be used. When the hidden switch is in the OFF state, i.e., in the user mode, the overall control unit 19 adjusts the restrictions imposed with regard to the length of time over which the TV tuner unit and the projector unit can be used, depending upon whether or not a memory card is loaded.

(1-1) Non-User Mode, Television Mode

When the hidden switch is in the ON state, the overall control unit 19 sets the TV tuner/projector-equipped digital camera in the non-user mode. As a signal indicating that the television mode has been selected is input from the mode selector switch 24 in the non-user mode, the overall control unit 19 drives the TV tuner unit to receive a television broadcast at the tuner 21. At this time, the overall control unit 19 stops the electric power supply to the projector unit. The overall control unit 19 displays the video image of the received television broadcast at the liquid crystal monitor 11. The overall control unit 19 limits the length of time over which the television broadcast is received to a predetermined length of time set at 30 seconds. Thus, when 30 seconds elapses following the video image display start, the overall control unit 19 stops driving the TV tuner unit.

(1-2) Non-User Mode, Projector Mode

As a signal indicating that the projector mode has been selected is input from the mode selector switch 24 in the non-user mode, the overall control unit 19 drives the projector unit. In addition, the overall control unit 19 drives the TV tuner unit so as to receive a television broadcast via the tuner 21. The overall control unit 19 projects the video image of the received television broadcast via the projector unit and also outputs the sound of the received television broadcast through the speaker 26. The overall control unit 19 also limits the length of time over which the television image is projected to a predetermined length of time set at 30 seconds. Namely, when 30 seconds elapses following the television image projection start, the overall control unit 19 turns off the LED light source 43 and stops driving the projector unit. It also stops driving the TV tuner unit.

(2-1) User Mode, Television Mode

When the hidden switch is in the OFF state, the overall control unit 19 sets the TV tuner/projector-equipped digital camera in the user mode. As a signal indicating that the television mode has been selected is input from the mode selector switch 24 in the user mode, the overall control unit 19 drives the TV tuner unit. The overall control unit 19 also adjusts the restrictions imposed with regard to the use of the TV tuner unit, i.e., a non-photographic unit, in correspondence to whether or not a memory card 12 is loaded. At this time, the overall control unit 19 stops the electric power supply to the projector unit.

(2-2-1) When No Memory Card is Loaded

When no memory card 12 is loaded, i.e., when no card detection signal is input from the card I/F 34, the overall control unit 19 displays the television broadcast image at the liquid crystal monitor 11 and outputs the sound through the speaker 26. In this situation, the overall control unit 19 does not impose any restrictions with regard to the length of time over which the television broadcast can be received.

(2-2-2) When a Memory Card is Loaded

When a memory card 12 is loaded, i.e., when a card detection signal is input from the card I/F 34, the overall control unit 19 displays the television broadcast image at the liquid crystal monitor 11 and outputs the sound through the speaker 26. In this situation, however, the overall control unit 19 imposes restrictions so as to limit the length of television broadcast reception to a predetermined length of time set at 30 seconds. Namely, when 30 seconds elapses following the television image display start, the overall control unit 19 stops driving the TV tuner unit.

(2-2) User Mode, Projector Mode

As a signal indicating that the projector mode has been selected is input from the mode selector switch 24 in the user mode, the overall control unit 19 drives the projector unit. The overall control unit 19 also adjusts the restrictions imposed with regard to the use of the projector unit, i.e., a non-photographic unit, in correspondence to whether or not a memory card 12 is loaded.

(2-2-1) When No Memory Card 12 is Loaded

When no memory card 12 is loaded, i.e., when no card detection signal is input from the card I/F 34, the overall control unit 19 makes a decision as to whether or not the television mode has been selected. If the television mode has been selected, the overall control unit 19 drives the TV tuner unit to receive a television broadcast at the tuner 21. Then, the overall control unit 12 projects the video image of the received television broadcast via the projector unit and also outputs the sound through the speaker 26. At this time, the overall control unit 19 does not impose any restrictions with regard to the use of the projector unit. If, on the other hand, the television mode is not currently selected, the overall control unit 19 turns off the LED light source 43 and stops driving the projector unit. Namely, it does not project the television image via the projector unit under these circumstances.

(2-2-2) When the Memory Card is Loaded

When the TV tuner/projector-equipped digital camera loaded with a memory card 12 is set in the television mode via the mode selector switch 24, the overall control unit drives the TV tuner unit to receive a television broadcast via the tuner 21. The overall control unit 19 then projects the image of the received television broadcast via the projector unit and outputs the sound through the speaker 26. If, on the other hand, the television mode has not been selected via the mode selector switch 24, the overall control unit 19 reads out image data stored in a memory card 12. The overall control unit 19 then projects the image corresponding to the image data having been read out via the projector unit. When the predetermined length of time, set at 30 seconds, elapses following the image projection start, the overall control unit 19 turns off the LED light source 43 and stops driving the projector unit. In other words, the overall control unit 19 imposes restrictions with regard to the length of time over which the projector unit can be utilized. It is to be noted that if the television mode has also been selected in the TV tuner/projector-equipped digital camera, the overall control unit 19 stops driving the TV tuner unit.

The following is an explanation of the operations executed in the TV tuner/projector-equipped digital camera in the fifth embodiment, given in reference to the flowchart presented in FIG. 9. The individual processing procedures shown in FIG. 9 are executed based upon a program by the overall control unit 19. The program based upon which the various types of processing in FIG. 9 is executed is stored in a memory (not shown) and is started up in response to an operation signal input via the mode selector switch 24.

In step S201, a decision is made as to whether or not the hidden switch has been turned on. If the hidden switch is in the ON state, an affirmative decision is made in step S201 and the operation proceeds to step S202. If, on the other hand, the hidden switch is in the OFF state, a negative decision is made in step S201 and the operation proceeds to step S213.

In step S202, a decision is made as to whether or not the projector mode has been selected. If a signal indicating that the projector mode has been selected is input from the mode selector switch 24, an affirmative decision is made in step S202 and the operation proceeds to step S209. In step S209, the image of the television broadcast received at the tuner 21 is projected via the projector unit and then the operation proceeds to step S210. The processing executed in step S210 (decision-making as to whether or not the predetermined length of time has elapsed) through step S212 (light source off) is similar to the processing executed in step S26 (decision-making as to whether or not the predetermined length of time has elapsed) through step S28 (light source off) in FIG. 6.

If no signal indicating that the projector mode has been selected is input from the mode selector switch 24, a negative decision is made in step S202 and the operation proceeds to step S203. The processing executed in step S203 (decision-making as to whether or not the television mode has been selected) through step S208 (monitor off) is similar to the processing executed in step S102 (decision-making as to whether or not the television mode has been selected) through step S107 (monitor off) in FIG. 7.

In step S213, to which the operation proceeds when the hidden switch is in the OFF state, a decision is made as to whether or not the projector mode has been selected. If a signal indicating that the projector mode has been selected is input from the mode selector switch 24, an affirmative decision is made in step S213 and the operation proceeds to step S222. If, on the other hand, no signal indicating that the projector mode has been selected is input from the mode selector switch 24, a negative decision is made in step S213 and the operation proceeds to step S214.

The processing executed in step S214 (decision-making as to whether or not the television mode has been selected) through step S221 (monitor off) is similar to the processing executed in step S108 (decision-making as to whether or not the television mode has been selected) through step S115 (monitor off) in FIG. 7.

In step S222, a decision is made as to whether or not a memory card 12 is loaded. If a card detection signal is input from the card I/F 34, an affirmative decision is made in step S222 and the operation proceeds to step S225. In step S225, the image of the television broadcast received at the tuner 21 or the image corresponding to image data read out from a memory card 12 is projected via the projector unit before the operation proceeds to step S226. The processing executed in step S226 (decision-making as to whether or not the predetermined length of time has elapsed) through step S228 (light source off) is similar to the processing executed in step S26 (decision-making as to whether or not the predetermined length of time has elapsed) through step S28 (light source off) in FIG. 6.

If no card detection signal is input from the card I/F 34, a negative decision is made in step S222 and the operation proceeds to step S223. In step S223, a decision is made as to whether or not the television mode has been selected. If a signal indicating that the television mode has been selected is input from the mode selector switch 24, an affirmative decision is made in step S223 and the operation proceeds to step S224. In step S224, the image of the television broadcast received at the tuner 21 is projected via the projector unit as in step S209. If, on the other hand, no signal indicating that the television mode has been selected is input from the mode selector switch 24, a negative decision is made in step S223 and the operation proceeds to step S228.

The following advantages are achieved in the TV tuner/projector-equipped digital camera in the fifth embodiment of the present invention described above.

(1) When the hidden switch is in the ON state in the TV tuner/projector-equipped digital camera set in the non-user mode, the overall control unit 19 imposes restrictions on the length of time over which the TV tuner unit, i.e., a non-photographic unit, is allowed to receive a television broadcast or the length of time over which the projector unit, i.e., a non-photographic unit can be engaged in image projection. Thus, by setting the TV tuner/projector-equipped digital camera on display at a retail shop in the non-user mode, the length of time over which a television broadcast can be displayed or an image can be projected while a prospective customer checks out the TV tuner/projector-equipped digital camera can be restricted to prevent excessive battery power consumption.

When the hidden switch is in the OFF state and the TV tuner/projector-equipped digital camera is set in the user mode, the overall control unit 19 upon detecting that a memory card 12 is loaded, imposes restrictions on the length of time over which the TV tuner unit is allowed to receive a television broadcast or the length of time over which the projector unit can be engaged in image projection. When a memory card 12 is loaded in the TV tuner/projector-equipped digital camera in the user mode, the user is likely to use the camera to photograph a subject. Since a non-photographic unit cannot be used over an extended period of time under such circumstances, excessive battery power consumption is prevented so as to ensure that sufficient battery power is available for the photographic unit operation while photographing the subject.

Sixth Embodiment

Figure 10:
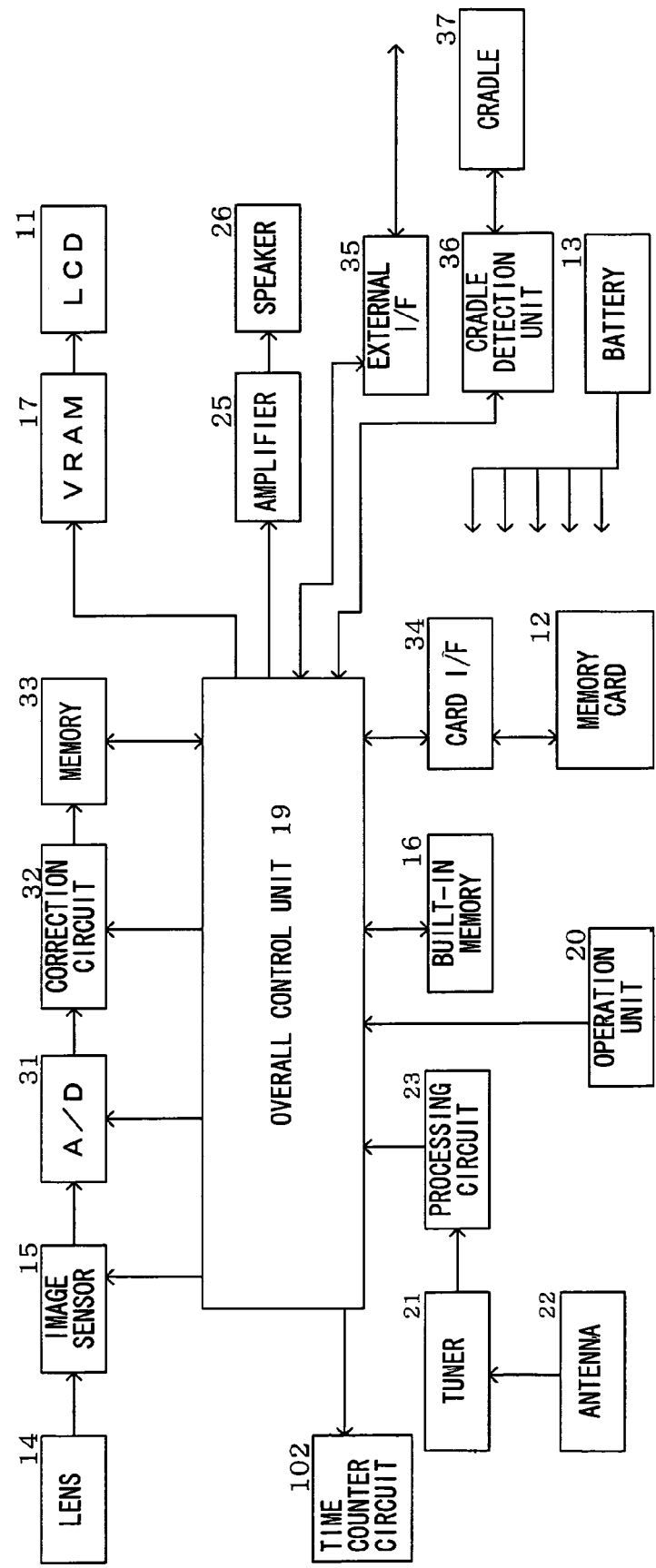
Figure 11:
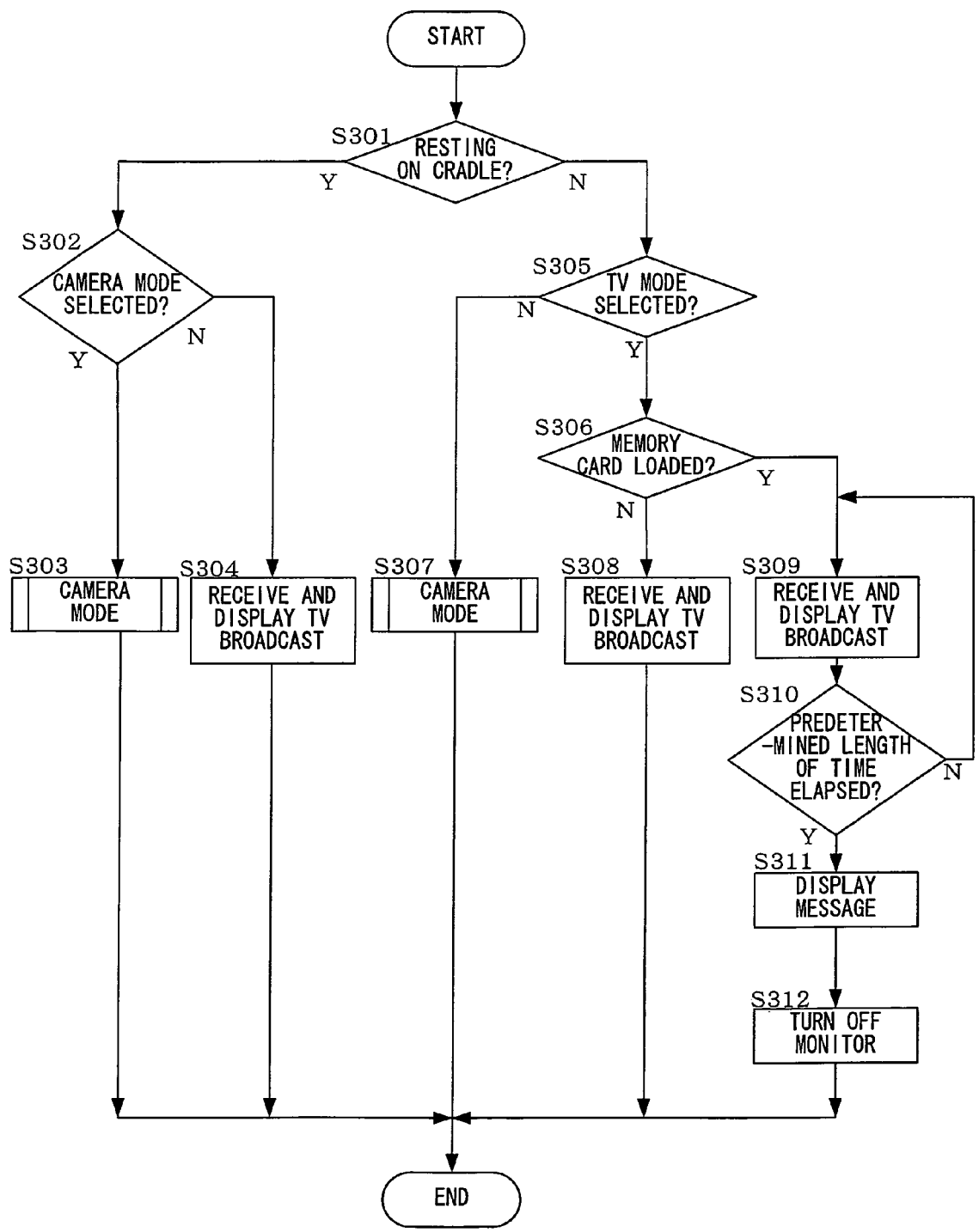

In reference to FIGS. 10 and 11, the TV tuner-equipped digital camera achieved in the sixth embodiment of the present invention is described by focusing on its difference from the TV tuner-equipped digital camera in the first embodiment. FIG. 10 is a block diagram showing the essential structure adopted in the TV tuner-equipped digital camera assuming an external appearance identical to that shown in FIG. 1. As shown in the block diagram in FIG. 10, it includes a cradle detection unit 37 that detects the resting state when the camera is set on a cradle 37.

When the TV tuner-equipped digital camera achieved in the sixth embodiment is placed on the cradle 37, i.e., when it is connected to an AC power source via the cradle 37, the overall control unit 19 does not impose any restrictions with regard to the length of time over which a television broadcast can be received regardless of whether or not a memory card 12 is loaded. When the TV tuner-equipped digital camera is not placed on the cradle 37, the overall control unit 19 imposes restrictions on the length of time over which a television broadcast can be received upon detecting that a memory card 12 is loaded via the card IN 34. If the TV tuner-equipped digital camera is not placed on the cradle 37 and the presence of a memory card 12 is not detected, the overall control unit 19 does not impose any restrictions on the length of time over which a television broadcast can be received.

The following is an explanation of the operations executed in the TV tuner-equipped digital camera in the embodiment given in reference to the flowchart presented in FIG. 11. The individual processing procedures shown in FIG. 11 are executed based upon a program by the overall control unit 19. The program based upon which the various types of processing in FIG. 11 is executed is stored in a memory (not shown) and is started up in response to an operation signal input via the mode selector switch 24.

In step S301, the state of the camera with regard to whether or not it is currently placed on the cradle 37 is detected. If a resting state signal is input from the cradle detection unit 36, an affirmative decision is made in step S301 and the operation proceeds to step S302. In step S302, a decision is made as to whether or not the camera mode has been selected. If the camera mode has been selected, an affirmative decision is made in step S302 and the operation proceeds to step S303. In step S303, processing similar to that executed in step S2 in FIG. 3 is executed before ending the series of processing. If the television mode has been selected, a negative decision is made in step S302 and the operation proceeds to step S304. In step S304, processing similar to that executed in step S4 in FIG. 3 is executed before ending the series of processing.

If, on the other hand, no resting state signal is input from the cradle detection unit 36, a negative decision is made in step S301 and the operation proceeds to step S305. The processing executed in step S305 (decision-making as to whether or not the television mode has been selected) through step S312 (monitor off) is similar to that executed in step S108 (decision-making as to whether or not the television mode has been selected) through step S115 (monitor off) in FIG. 7.

The following advantages are achieved in the TV tuner-equipped digital camera in the sixth embodiment described above.

(1) Upon detecting that no electric power is currently supplied via the cradle 37, i.e., an external power source, the overall control unit 19 imposes restrictions with regard to the length of time over which a television broadcast can be received at the TV tuner unit, which is a non-photographic unit. Thus, since a television broadcast cannot be displayed over an extended period of time unless electric power is being supplied from the external power source, excessive battery power consumption is prevented.

(2) If the presence of the memory card is not detected while no electric power is being received from the cradle 37, the overall control unit 19 does not impose any restrictions with regard to the length of time over which a television broadcast can be received at the TV tuner unit, i.e., a non-photographic unit. If there is no memory card 12 loaded in the camera while no electric power is being received from the external power source, the user is not likely to be using the camera to photograph a subject. Since the need to secure the electric power required in the photographic unit operations to photograph the subject is thus eliminated, the non-photographic unit can be utilized anytime the user desires under these circumstances.

(3) If it is detected that the electric power is being supplied from the cradle 37, the overall control unit 19 does not impose any restrictions on the use of the TV tuner unit, i.e., a non-photographic unit. When the camera is placed on the cradle 37, it is connected via the cradle 37 to the AC power source and thus, the battery power in the battery within the camera does not need to be used. This means that even if the non-photographic unit is engaged in operation over an extended period of time, excessive consumption of battery power does not occur, allowing the user to utilize the non-photographic unit as he wishes.

The embodiments described above allow for the following variations.

(1) Instead of restricting the use of a non-photographic unit depending upon whether or not a memory card 12 is loaded in the digital camera, the overall control unit 19 may limit the use of the non-photographic unit based upon the remaining storage capacity available in a memory card 12. In such a case, the overall control unit 19 should make a decision as to whether or not information indicating the remaining storage capacity available in a memory card 12, input via the card I/F 34, indicates a value equal to or less than a predetermined reference value. If the remaining storage capacity at a memory card 12 is equal to or less than the predetermined reference value when the hidden switch is in the OFF state or the camera is not currently resting on the cradle 37, the overall control unit 19 does not need to impose restrictions on the use of the non-photographic unit. When the hidden switch is in the ON state or the camera is currently resting on the cradle 37, the overall control unit 19 does not need to restrict the use of the non-photographic unit regardless of the available storage capacity at a memory card 12.

If the camera includes a built-in memory and thus does not require a memory card 12, the overall control unit 19 may restrict the use of the non-photographic unit based upon the available storage capacity in the built-in memory. In such a case, the overall control unit 19 will need to detect the remaining storage capacity at the built-in memory. Then, the overall control unit 19 will make a decision as to whether or not the detected remaining storage capacity at the built-in memory is equal to or less than a predetermined reference value. If the remaining storage capacity at the built-in memory is equal to or less than the predetermined reference value when the hidden switch is in the OFF state or the camera is not currently resting on the cradle 37, the overall control unit 19 will not need to impose restrictions on the use of the non-photographic unit. When the hidden switch is in the ON state or the camera is currently resting on the cradle 37, the overall control unit 19 will not need to restrict the use of the non-photographic unit regardless of the available storage capacity at the built-in memory.

(2) While an explanation is given above on examples in which the digital camera is equipped with a non-photographic unit with significant electric power requirements such as a TV tuner or a projector, a unit with significant electric power requirements is not limited to a TV tuner or a projector. For instance, the present invention may be adopted when the digital camera is equipped with a monitor or a unit with significant IC power requirements such as a portable video game unit or a communication device. In other words, the present invention can be adopted in various types of electronic devices equipped with cameras.

It is to be noted that while an explanation is given above on specific embodiments and variations thereof, the present invention is not limited to their particular details and it will be understood by those skilled in the art that various changes in form and detail may be made therein without departing from the scope and teaching of the invention. Namely, as long as the electric power consumption at a non-photographic unit that uses more electric power than the electric power required for camera operations is controlled, any other restrictions apart from the restrictions on the length of time or the restrictions on the mode of use, may be imposed. For instance, if the non-photographic unit has a plurality of functions with varying electric power requirements, an operation with particularly large electric power requirements may be disallowed. Under such circumstances, restrictions may be imposed on the length of time over which an operation with relatively small electric power requirements can be executed or an operation that does not require significant electric power consumption may be executed without restrictions.

The disclosure of the following priority application is herein incorporated by reference:

The invention claimed is:

1. A camera-equipped electronic device, comprising: a photographic unit that stores in a storage medium an image obtained by photographing a subject via an imaging unit; a non-photographic unit that executes non-photographing processing different from photographing processing executed in the photographic unit and requires greater electric power than is required by the photographing processing; a decision-making unit that makes a decision as to whether or not a current state of use is such that if the non-photographic unit is engaged in operation over a predetermined length of time, remaining battery capacity will be depleted to a level equal to or less than a predetermined value; a restricting unit that imposes restrictions on a use of the non-photographic unit with regard to consumption of the electric power based upon results of the decision made by the decision-making unit; and a mode selection unit that selects one of a photographic mode and a non-photographic mode, the photographic unit engaged in operation with or without the storage medium loaded in the camera-equipped electronic device in the photographic mode and the non-photographic unit engaging in operation in the non-photographic mode, wherein the decision-making unit includes a detection unit that detects a presence of the storage medium loaded in the camera-equipped electronic device, the restricting unit restricts the use of the non-photographic unit with regard to the consumption of the electric power in correspondence to the detected presence of the storage medium, and the restricting unit restricts the use of the non-photographic unit if the non-photographic mode is selected by the mode selection unit and the presence of the storage medium loaded in the camera-equipped electronic device is not detected.

2. A camera-equipped electronic device according to claim 1, wherein:
the decision-making unit includes a mode selector unit that selects one of a user mode and a non-user mode; and
the restricting unit restricts the use of the non-photographic unit when the non-user mode has been selected.

3. A camera-equipped electronic device according to claim 2, wherein:
the restricting unit restricts the use of the non-photographic unit when the user mode has been selected and the presence of the storage medium loaded in the camera-equipped electronic device is detected.

4. A camera-equipped electronic device according to claim 1, further comprising:
a mode selector unit that selects one of a user mode and a non-user mode, wherein:
the restricting unit restricts the use of the non-photographic unit when the user mode has been selected and the presence of the storage medium loaded in the camera-equipped electronic device is detected.

5. A camera-equipped electronic device according to claim 1, further comprising:
a mode selector unit that selects one of a user mode and a non-user mode, wherein:
the detection unit includes a capacity detection unit that detects a remaining storage capacity available in the storage medium; and
when the user mode has been selected and the detected remaining storage capacity available at the storage medium is equal to or less than a reference value, the restricting unit does not restrict the use of the non-photographic unit, whereas when the non-user mode has been selected, the restricting unit restricts the use of the non-photographic unit regardless of the detected remaining storage capacity available at the storage medium.

6. A camera-equipped electronic device according to claim 1, wherein:
the decision-making unit includes a power supply detection unit that detects whether or not electric power is being supplied to the camera-equipped electronic device from an external power source; and
the restricting unit restricts the use of the non-photographic unit with regard to consumption of the electric power when the power supply detection unit detects that no electric power is being supplied to the camera-equipped electronic device from the external power source.

7. A camera-equipped electronic device according to claim 6, wherein
the restricting unit does not restrict the use of the non-photographic unit when the detection unit does not detect the presence of the storage medium loaded in the camera-equipped electronic device.

8. A camera-equipped electronic device according to claim 6, wherein:
the restricting unit does not restrict the use of the non-photographic unit with regard to the consumption of the electric power when the power supply detection unit detects that electric power is being supplied from the external power source to the camera-equipped electronic device.

9. A camera-equipped electronic device according to claim 1, further comprising:
a selection unit that selects one of the photographic unit and the non-photographic unit, wherein:
the restricting unit imposes restrictions on the use of the non-photographic unit on condition that the non-photographic unit has been selected by the selection unit.

10. A camera-equipped electronic device according to claim 1, wherein:
the restricting unit performs one of allowance of the non-photographic unit to be engaged in operation over only a predetermined length of time and disallowance of engagement of a specific function among a plurality of functions of the non-photographic unit.

11. A camera-equipped electronic device according to claim 1, wherein:
the non-photographic unit is at least one of a television unit and a projector.

12. A camera-equipped electronic device, comprising: a photographic unit that captures an image; a projector; a battery that provides electric power to the photographic unit and the projector; a decision-making unit that makes a decision as to whether or not a current state of use is such that if the projector is engaged in operation over a predetermined length of time, remaining battery capacity will be depleted to a level equal to or less than a predetermined value; a restriction unit that imposes restrictions on a use of the projector with regard to consumption of the electric power based upon results of the decision made by the decision-making unit; and a mode selection unit that selects one of a photographic mode and a projector mode, the photographic unit engaging in operation with or without the storage medium loaded in the camera-equipped electronic device or not in the photographic mode and the projector engaging in operation in the projector mode, wherein the decision-making unit includes a detection unit that detects a presence of the storage medium loaded in the camera-equipped electronic device, the restriction unit restricts the use of the projector with regard to the consumption of the electric power in correspondence to the detected presence of the storage medium, and the restriction unit restricts the use of the projector if the projector mode is selected by the mode selection unit and the presence of the storage medium loaded in the camera-equipped electronic device is not detected.

13. The camera-equipped electronic device according to claim 12, wherein
the restriction unit stops a projection by the projector after an elapse of a certain period of time.

14. The camera-equipped electronic device according to claim 13, wherein
the certain period of time is set by a user.

15. The camera-equipped electronic device according to claim 13, wherein
the restriction unit sends a message to a user that the projection will be stopped before stopping the projection by the projector.

16. The camera-equipped electronic device according to claim 15, wherein
the restriction unit sends the message through the projection by the projector.

17. The camera-equipped electronic device according to claim 12, wherein
the projector comprises a light source and a brightness controller controlling an amount of light irradiated from the light source,
wherein the restriction unit controls the brightness controller so that the consumption of battery power by the light source is reduced.

18. The camera-equipped electronic device according to claim 12, wherein
the decision-making unit comprises a power supply detector that detects whether or not electric power is being supplied from an external power source; and
the restriction unit does not restrict the use of the projector when the power supply detection unit detects that electric power is being supplied from the external power source.

19. The camera-equipped electronic device according to claim 12, further comprising:
a television unit that receives a television broadcast, wherein
the projector projects the television broadcast received by the television unit.

20. A camera-equipped electronic device, comprising: a photographic unit that captures an image; a television unit that receives a broadcast; a display that displays at least one of the image captured by the photographic unit and the television broadcast received by the television unit; a battery that provides electric power to the photographic unit and the television unit; a decision-making unit that makes a decision as to whether or not a current state of use is such that if the television unit is engaged in operation over a predetermined length of time, remaining battery capacity will be depleted to a level equal to or less than a predetermined value; a restriction unit that imposes restrictions on a use of the television unit with regard to consumption of the electric power based upon results of the decision made by the decision-making unit; and a mode selection unit that selects one of a photographic mode and a television mode, the photographic unit engaging in operation with or without the storage medium loaded in the camera-equipped electronic device or not in the photographic mode and the television unit engaging in operation in the television mode, wherein the decision-making unit includes a detection unit that detects a presence of the storage medium loaded in the camera-equipped electronic device, the restriction unit restricts the use of the television unit with regard to the consumption of the electric power in correspondence to the detected presence of the storage medium, and the restriction unit restricts the use of the television unit if the television mode is selected by the mode selection unit and the presence of the storage medium loaded in the camera-equipped electronic device is not detected.

21. The camera-equipped electronic device according to claim 20, wherein
the restriction unit stops a receiving of the television broadcast by the television unit after an elapse of a certain period of time.

22. The camera-equipped electronic device according to claim 21, wherein
the certain period of time is set by a user.

23. The camera-equipped electronic device according to claim 21, wherein
the restriction unit controls the display before stopping the receiving of the television broadcast so that the display sends a message to a user that the receiving of the television broadcast will be stopped.

24. The camera-equipped electronic device according to claim 20, wherein
the decision-making unit comprises a power supply detector that detects whether or not electric power is being supplied from an external power source; and
the restriction unit does not restrict the use of the television unit when the power supply detection unit detects that electric power is being supplied from the external power source.

25. The camera-equipped electronic device according to claim 20, further comprising:
a projector that projects the television broadcast received by the television unit.

* * * * *